US009778956B1

(12) United States Patent
Harwood et al.

(10) Patent No.: US 9,778,956 B1
(45) Date of Patent: Oct. 3, 2017

(54) MULTI-DIMENSIONAL SCHEDULING IN CONVERGED INFRASTRUCTURE

(71) Applicant: EMC Corporation, Hopkinton, MA (US)

(72) Inventors: John S. Harwood, Paxton, MA (US); Suresh Kumar, Sunnyvale, CA (US); Vaibhav Khanduja, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/863,958

(22) Filed: Sep. 24, 2015

(51) Int. Cl.
*G06F 9/46* (2006.01)
*G06F 9/50* (2006.01)
*G06F 9/48* (2006.01)

(52) U.S. Cl.
CPC .......... *G06F 9/5011* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2013/0014107 A1* | 1/2013 | Kirchhofer | ........... | G06F 9/5083 718/1 |
| 2013/0304903 A1* | 11/2013 | Mick | ................... | H04L 43/0817 709/224 |
| 2014/0059196 A1 | 2/2014 | Onffroy et al. | | |
| 2014/0109094 A1 | 4/2014 | Datla et al. | | |
| 2014/0109097 A1 | 4/2014 | Datla et al. | | |
| 2016/0321113 A1* | 11/2016 | Pinto | ................... | G06F 9/45533 |

OTHER PUBLICATIONS

ETSI GS NFV-INV 03 V1.1.1.1 (Dec. 2014).*

* cited by examiner

*Primary Examiner* — Sisley Kim
(74) *Attorney, Agent, or Firm* — Ryan, Mason & Lewis, LLP

(57) ABSTRACT

An apparatus comprises a processing platform implementing a plurality of resources of converged infrastructure of an information processing system. A multi-dimensional scheduler is associated with the plurality of resources. First and second ones of the plurality of resources of the converged infrastructure are logically partitioned by the multi-dimensional scheduler into multiple virtual sets of resources for performance of processing jobs associated with respective applications such that the virtual sets of resources comprise respective portions of each of the first and second ones of the plurality of resources. An additional one of the plurality of resources of the converged infrastructure is time-shared between at least a subset of the multiple virtual sets of resources under the control of the multi-dimensional scheduler in performing the corresponding processing jobs associated with the respective applications. The multi-dimensional scheduler thereby operates over spatial and time dimensions with regard to different resources of the converged infrastructure.

20 Claims, 5 Drawing Sheets

MULTI-DIMENSIONAL SCHEDULING IN CONVERGED INFRASTRUCTURE

FIELD

The field relates generally to information processing systems, and more particularly to techniques for provisioning resources in information processing systems.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Alternative virtual resources now coming into use in information processing systems include Linux containers. Such containers may be used to provide at least a portion of the virtualization infrastructure of a given information processing system. However, significant challenges remain in deployment of resources for sharing by multiple applications in virtualization infrastructure and other types of converged infrastructure comprising racks of components. For example, in such environments it can be difficult to provide optimal resource utilization across resource pools that include distinct monolithic resources.

SUMMARY

Illustrative embodiments provide techniques for multi-dimensional scheduling in converged infrastructure. Such arrangements facilitate the effective utilization of distinct monolithic resources in converged infrastructure.

In one embodiment, an apparatus comprises at least one processing platform implementing a plurality of resources of converged infrastructure of an information processing system, and a multi-dimensional scheduler associated with the plurality of resources. At least first and second ones of the plurality of resources of the converged infrastructure are logically partitioned by the multi-dimensional scheduler into multiple virtual sets of resources for performance of processing jobs associated with respective applications such that the multiple virtual sets of resources comprise respective portions of each of the first and second ones of the plurality of resources. At least an additional one of the plurality of resources of the converged infrastructure is time-shared between at least a subset of the multiple virtual sets of resources under the control of the multi-dimensional scheduler in performing the corresponding processing jobs associated with the respective applications. The multi-dimensional scheduler thereby performs scheduling of the first and second resources over a spatial dimension and scheduling of the at least one additional resource over a time dimension.

As noted above, illustrative embodiments described herein provide significant improvements relative to conventional arrangements. For example, in some of these embodiments, difficulties associated with underutilization of monolithic resources in conventional arrangements are avoided, leading to improvements in overall resource utilization and performance in an information processing system comprising converged infrastructure.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as converged infrastructure.

Figure 1:
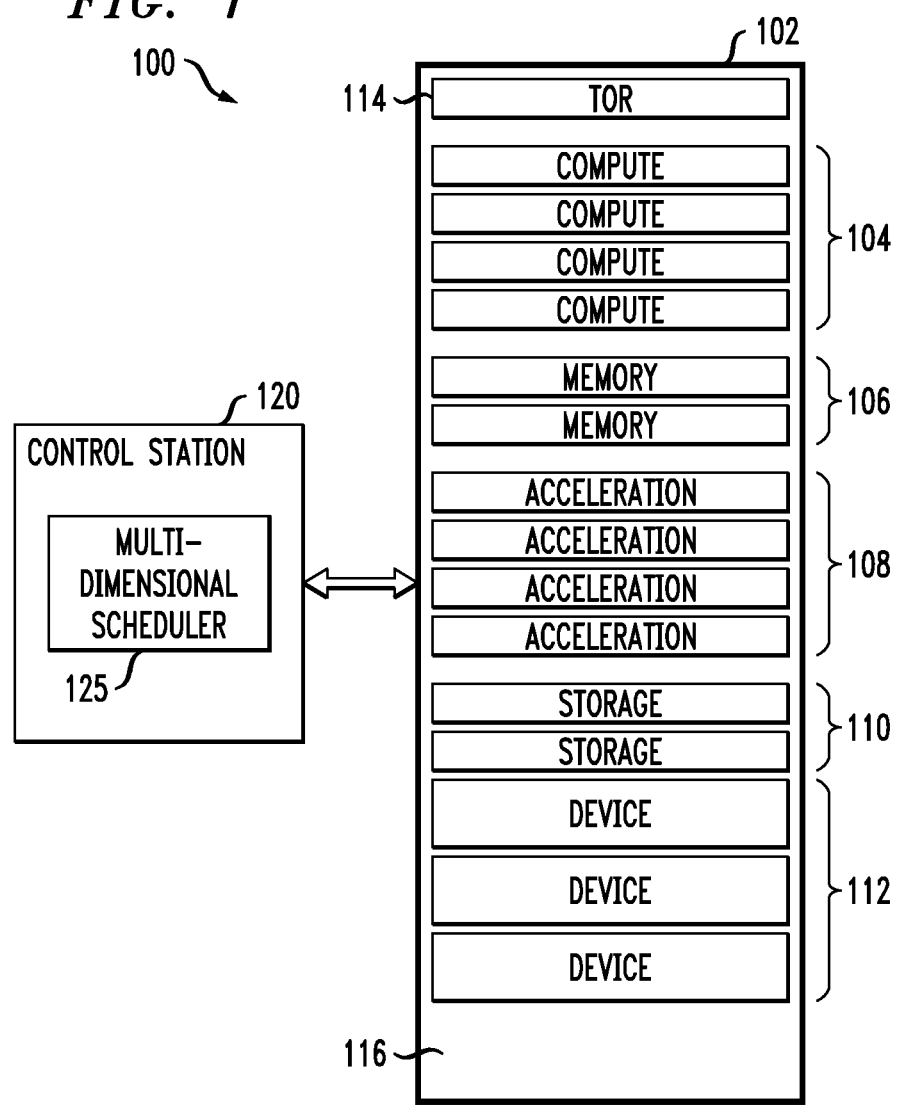
FIG. 1 is a block diagram of an information processing system comprising converged infrastructure in the form of a rack of resource components having an associated control station in an illustrative embodiment.

FIG. 1 shows an information processing system 100 configured in accordance with an illustrative embodiment. The system 100 comprises a rack 102 of components with one or more of the components being associated with at least one particular monolithic resource. The resources in the rack 102 of components in this embodiment illustratively include respective compute resources 104, memory resources 106, acceleration resources 108, storage resources 110 and device resources 112. The rack 102 further includes a top-of-rack (TOR) component 114 at an upper portion of the rack and additional space 116 at a lower portion of the rack. The TOR component 114 illustratively includes one or more switch fabrics for connecting other components of the rack 102 to a network or to other racks of the system 100. It may be considered another type of resource of the system 100. The additional space 116 is typically configured to accommodate additional rack-related equipment such as fans, power supplies, heat sinks or other similar components.

Although only a single rack 102 is shown in this embodiment, it should be understood that the system 100 can include multiple additional racks. These and other rack arrangements comprising components such as compute resources 104, memory resources 106, acceleration resources 108, storage resources 110 and device resources 112 should be viewed as examples of what are more generally referred to herein as "converged infrastructure" of an information processing system.

The information processing system 100 further comprises a control station 120 coupled to or otherwise associated with the rack 102. Although shown as a separate component relative to the rack 102 in this illustrative embodiment, the control station 120 can be implemented at least in part within one or more of the components of the rack 102, such as within the TOR component 114. Additionally or alternatively, the control station 120 can be implemented at least in part within a different rack of the system 100, although such an additional rack is not explicitly shown in the figure. The control station 120 is considered part of the converged infrastructure of the system 100.

The control station 120 in some embodiments comprises a compute element that has network connectivity and accordingly can reside anywhere within the system 100. Other components of the system 100 such as the resources 104 through 112 and the TOR component 114 can each include one or more clients that communicate with corresponding control elements of the control station 120.

The rack 102 comprising components 104 through 114 and the associated control station 120 collectively comprise at least one processing platform implementing a plurality of resources of the converged infrastructure of the information processing system 100. Such a processing platform illustratively comprises multiple processing devices each comprising a processor coupled to a memory. For example, a given processing device or set of multiple processing devices may be used to implement the control station 120.

The control station 120 in the present embodiment further comprises a multi-dimensional scheduler 125 associated with the resources of the rack 102 including the compute resources 104, memory resources 106, acceleration resources 108, storage resources 110 and device resources 112. As will be described in more detail below, the multi-dimensional scheduler 125 is configured to logically partition at least first and second ones of the resources 104 through 112 into multiple virtual sets of resources for performance of processing jobs associated with respective applications. As a result of this logical partitioning, the multiple virtual sets of resources comprise respective portions of each of the first and second ones of the plurality of resources. Moreover, the multi-dimensional scheduler 125 is further configured to control time sharing of at least an additional one of the resources 104 through 112 between at least a subset of the multiple virtual sets of resources in performing the corresponding processing jobs associated with the respective applications.

Accordingly, the multi-dimensional scheduler 125 in the FIG. 1 embodiment performs scheduling of the first and second resources over a spatial dimension and scheduling of the at least one additional resource over a time dimension. This scheduling of certain ones of the resources 104 through 112 over a spatial dimension and scheduling of other ones of the resources 104 through 112 over a time dimension is an example of what is more generally referred to herein as "multi-dimensional scheduling" of resources in converged infrastructure.

The first and second resources that are subject to scheduling over a spatial dimension through logical partitioning can include different combinations of the resources 104 through 112. For example, the first and second resources can comprise respective compute and storage resources 104 and 110. Alternatively, the first and second resources can comprise respective memory and device resources 106 and 112.

In the latter arrangement, the device resources can illustratively comprise network interface resources or other types of device resources. Numerous alternative arrangements of two or more of the resources 104 through 112 can be subject to scheduling over a spatial dimension through logical partitioning. Accordingly, the first and second resources comprise respective ones of the resources 104 through 112 that are subject to logical partitioning and the additional resource comprises at least one of the resources 104 through 112 that is not subject to logical partitioning.

In the FIG. 1 embodiment, it is assumed for purposes of illustration that the particular additional resource that is not subject to logical partitioning is the acceleration resource 108. This acceleration resource 108 in some embodiments is configured for performance of a singular processing job of a particular type, and is therefore also referred to herein as a monolithic resource. By way of example, the acceleration resources 108 may be implemented utilizing a field-programmable gate array (FPGA), an application-specific integrated circuit (ASIC) or a graphics processing unit (GPU), as well as various combinations of these and other specialized hardware acceleration elements.

The acceleration resources 108 if subject to logical partitioning among applications or other users of these resources can lead to sub-optimal utilization of the available resources of rack 102 as a whole. The multi-dimensional scheduler 125 is therefore configured to apply a different type of scheduling to the acceleration resources 108, namely, one in which the resources 108 are time-shared among the multiple virtual sets of resources that are formed by logical partitioning of two or more of the other resources 104, 106, 110 and 112. This multi-dimensional scheduling tends to improve the overall utilization of a resource pool comprising all of the resources 104 through 112 of the rack 102, leading to improved performance in the system 100 relative to conventional arrangements.

As noted above, at least portions of the TOR component 114 can also be considered resources that are subject to either logical partitioning or time sharing depending upon the particular implementation. Accordingly, references herein to multi-dimensional scheduling of the resources of the rack 102 can in some embodiments involve application of such scheduling to at least portions of the TOR component 114.

The logical partitioning of the resources 104, 106, 110 and 112 can be performed using techniques that are typically used to provide virtual resources to applications or other users. For example, compute resources 104 can be logically partitioned into a plurality of virtual central processing units (CPUs). Similarly, memory resources 106 can be logically partitioned into a plurality of virtual flash memories, and storage resources 110 can be logically partitioned into a plurality of virtual storage volumes. Assuming that the device resources include network interface resources, the network interface resources can be partitioned into a plurality of virtual network interface cards (NICs).

Such partitioning is utilized to schedule resources along what is referred to herein as a spatial dimension. A given set of virtual resources scheduled in this manner by the multi-dimensional scheduler 125 may comprise, for example, a virtual CPU from the compute resources 104, a virtual flash memory from the memory resources 106, a virtual storage volume from the storage resources 110 and a virtual NIC from the network interface resources of the device resources 112. Numerous other combinations of virtual resources may be used in configuring the above-noted multiple virtual sets of resources for performance of processing jobs associated with respective applications in the system 100.

In some embodiments, a given one of the virtual sets of resources and its time-shared portion of at least one additional resource are part of a container comprising an associated grouping of resources in which the associated application is configured to run in performing the corresponding processing job. Such a container illustratively comprises a Docker container or other type of Linux container (LXC). The containers may be associated with respective tenants of a multi-tenant environment of the system 100, although in other embodiments a given tenant can have multiple containers.

The containers may be utilized to implement a variety of different types of functionality within the system 100. For example, such containers can be used to implement platform-as-a-service (PaaS) or infrastructure-as-a-service (IaaS) functionality in system 100, as well as microservices of converged infrastructure within a data center or other cloud computing and storage system. As a more particular example, containers can be used to implement respective cloud compute nodes or cloud storage nodes of a cloud computing and storage system. Such compute nodes or storage nodes may be associated with respective cloud tenants of a multi-tenant environment of system 100.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-dimensional scheduling of resources in converged infrastructure as disclosed herein.

The operation of an illustrative embodiment of an information processing system will now be described in further detail with reference to the flow diagram of FIG. 2. The process as shown includes steps 200 through 204. These steps are assumed in the present embodiment to be performed at least in part by a control station such as control station 120 in the FIG. 1 embodiment possibly in conjunction with one or more other elements of converged infrastructure of an information processing system. The control station and any such other elements of the converged infrastructure are assumed to be implemented by at least one processing device comprising a processor coupled to a memory.

In step 200, resources of converged infrastructure of an information processing system are identified. For example, in the context of the FIG. 1 embodiment, resources such as compute resources 104, memory resources 106, acceleration resources 108, storage resources 110 and device resources 112 are identified. The identified resources will be subject to multi-dimensional scheduling in the system.

In step 202, at least first and second ones of the identified resources of the converged infrastructure are logically partitioned into multiple virtual sets of resources for performance of processing jobs associated with respective applications such that the multiple virtual sets of resources comprise respective portions of each of the first and second ones of the plurality of resources.

In step 204, at least an additional one of the resources of the converged infrastructure is time-shared between at least a subset of the multiple virtual sets of resources in performing the corresponding processing jobs associated with the respective applications. As a result, the first and second resources are scheduled over a spatial dimension and the additional resource is scheduled over a time dimension.

As noted above, a given one of the virtual sets of resources and its time-shared portion of the additional resource may be part of a container in which the associated application is configured to run in performing the corresponding processing job.

The logical partitioning and the time-sharing of respective steps 202 and 204 are illustratively performed by a multi-dimensional scheduler such as the scheduler 125 implemented in the control station 120 of the FIG. 1 embodiment. Such a control station can be coupled to multiple racks of the system and utilized to perform multi-dimensional scheduling over a pool of resources comprising resources of the multiple racks. Numerous other arrangements of converged infrastructure can be subject to multi-dimensional scheduling along spatial and time dimensions in other embodiments.

In some embodiments, a multi-dimensional scheduler is configured to provide an abstraction layer arranged between the at least first and second resources and the at least one additional resource. An example of such an abstraction layer will be described below in conjunction with FIGS. 5A and 5B.

Figure 2:
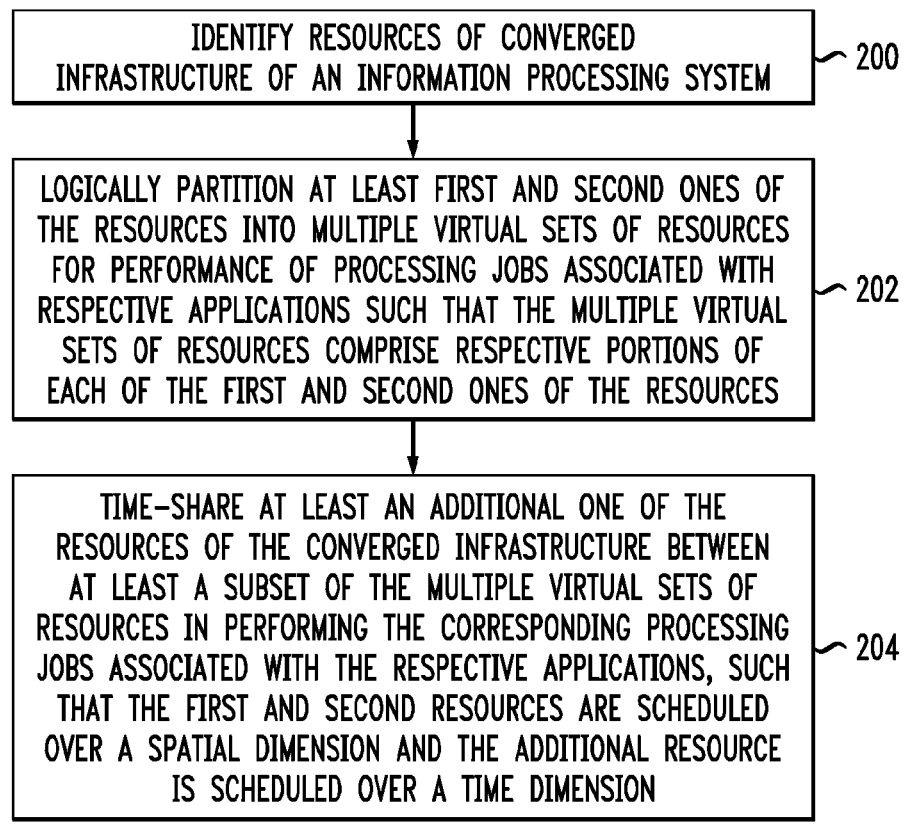
FIG. 2 is a flow diagram of a process for multi-dimensional scheduling of resources in converged infrastructure in an illustrative embodiment.

A multi-dimensional scheduler configured to implement at least portions of the FIG. 2 process can operate in conjunction with other system elements. For example, an orchestrator may be coupled between the multi-dimensional scheduler and the resources with the orchestrator being configured to provide information regarding the resources to the multi-dimensional scheduler and to build functions based on the resources for utilization in performing the processing jobs. A given one of the virtual sets of resources and its time-shared portion of the additional resource can be bound together by the orchestrator into one or more functions utilized to meet specified requirements of the associated application in performing the corresponding processing job. Such functions are illustratively each configured to support pause and resume functionality through persistence of state information until terminated. Multiple functions can be combined to support the provision of a wide variety of services within the system.

The particular processing operations and other system functionality described in conjunction with the flow diagram of FIG. 2 are presented by way of illustrative example only, and should not be construed as limiting the scope of the invention in any way. Alternative embodiments can use other types of processing operations involving multi-dimensional scheduling over spatial and time dimensions for respective different groups of one or more resources in converged infrastructure. For example, the ordering of the process steps may be varied in other embodiments, or certain steps may be performed concurrently with one another rather than serially as shown. Also, one or more of the process steps may be repeated periodically for different processing scenarios, or performed in parallel with one another. For example, parallel instantiations of one or more of the process steps can be implemented for different groups of tenants within the system.

Multi-dimensional scheduling functionality such as that described in conjunction with the flow diagram of FIG. 2 can be implemented at least in part in the form of one or more software programs stored in memory and executed by a processor of a processing device such as a computer or server. For example, the control station 120 illustratively comprises one or more software programs configured to run on underlying hardware of at least one processing device. As will be described below, a memory or other storage device having executable program code of one or more software programs embodied therein is an example of what is more generally referred to herein as a "processor-readable storage medium."

Additional details regarding illustrative embodiments of the invention will now be described with reference to FIGS. 3 through 6.

Figure 3:
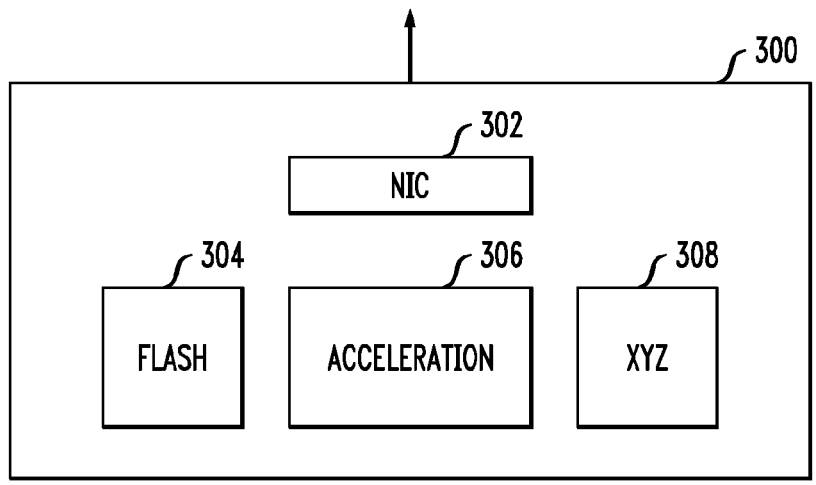
FIG. 3 shows an example of a physical set of resources in the converged infrastructure of FIG. 1.

Referring now to FIG. 3, an example of a physical set of resources 300 is shown. The physical set of resources 300 represents a particular grouping of resource elements selected from the resources 104 through 112 in the converged infrastructure of system 100 of FIG. 1. The physical set of resources 300 comprises an NIC 302, a flash memory 304, an acceleration element 306, and one or more additional physical devices 308 collectively denoted as XYZ. The acceleration element 306 illustratively comprises an FPGA, ASIC or GPU. The physical devices 308 can include additional or alternative acceleration elements of other types, such as future acceleration elements not yet developed. Such acceleration elements are generally monolithic in nature, in that they are programmed or otherwise configured to provide particular designated types of functionality within the system. These and other monolithic resources of the system 100 may not be suitable for logical partitioning.

Figure 4:
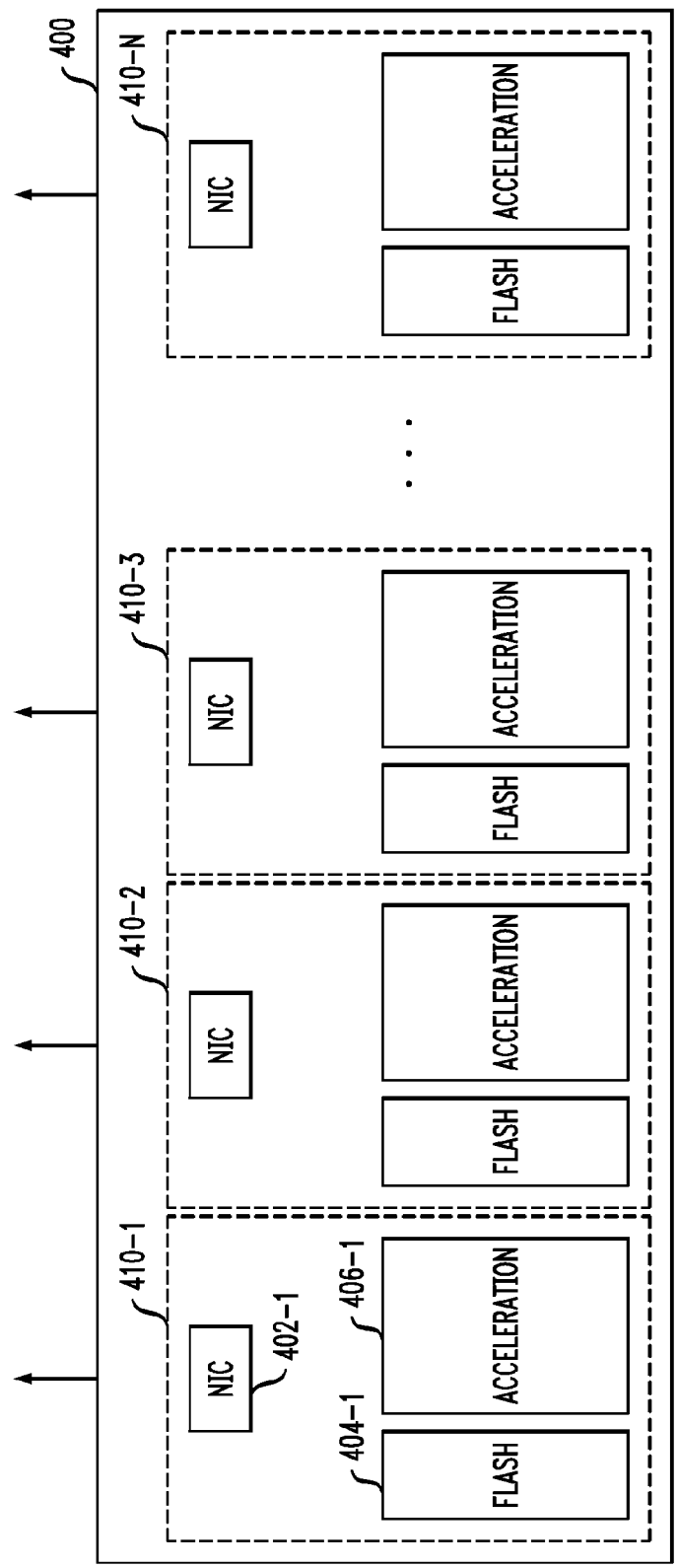
FIG. 4 shows an example of multiple virtual sets of resources in the converged infrastructure of FIG. 1.

The physical set of resources 300 of FIG. 3 can be replicated as multiple virtual sets of resources of the converged infrastructure as illustrated in FIG. 4. In this embodiment, multiple virtual sets of resources 400 include respective instances 410-1, 410-2, 410-3, . . . 410-N, each including an NIC 402, a flash memory 404 and an acceleration element 406. The additional or alternative acceleration elements such as XYZ elements 308 are eliminated from the figure for simplicity and clarity of illustration.

The exemplary arrangement of FIG. 4 is one in which all of the resources comprising the multiple virtual sets of resources 400 are subject to logical partitioning. However, the multi-dimensional scheduling in illustrative embodiments herein does not logically partition all of the resources. Instead, logical partitioning is applied to at least first and second ones of the resources of the converged infrastructure by scheduling those resources along a spatial dimension to create multiple virtual sets of resources comprising respective portions of the first and second resources, while one or more other resources of the converged infrastructure are time-shared by the multiple virtual sets of resources through scheduling of the one or more other resources along a time dimension. In these embodiments, it is assumed that the acceleration resources are time-shared through scheduling along the time dimension.

Figure 5B:
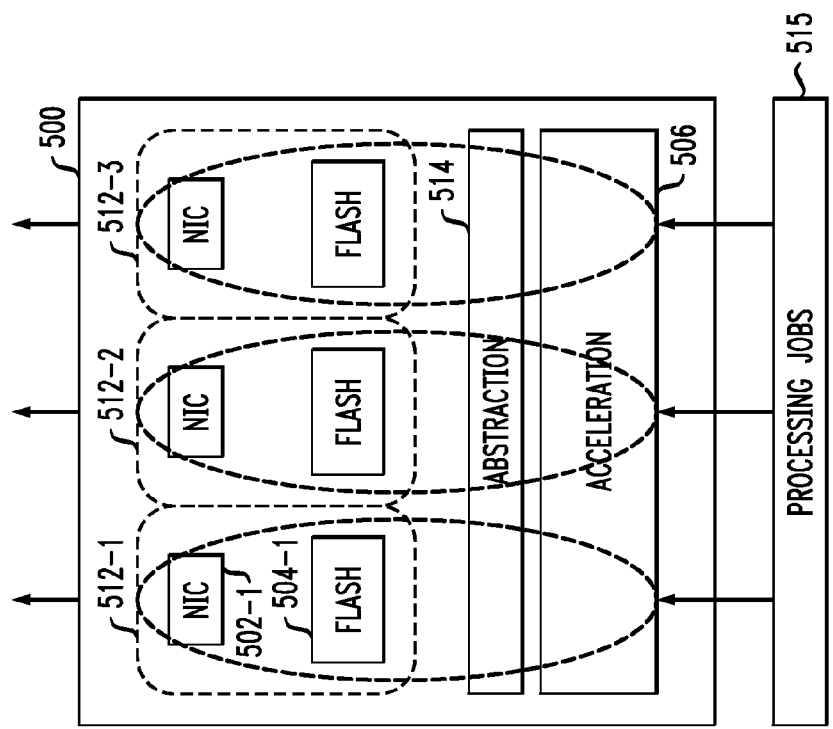
FIG. 5B illustrates association of processing jobs with respective ones of the virtual sets of resources and their time-shared portions of the underlying physical resource in the multi-dimensional scheduling example of FIG. 5A.
Figure 5A:
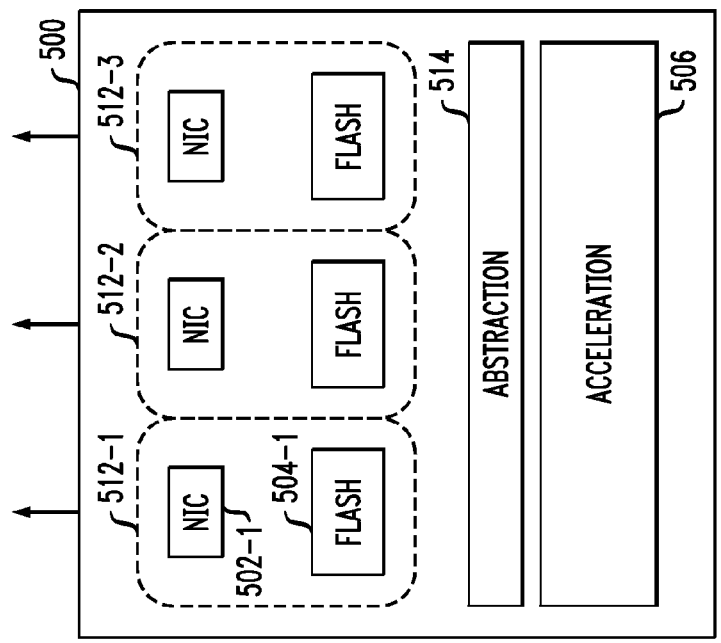
FIG. 5A shows an example of multiple virtual sets of resources time-sharing an underlying physical resource via an abstraction layer using multi-dimensional scheduling.

An example of an embodiment of this type is illustrated in FIGS. 5A and 5B. Referring initially to FIG. 5A, converged infrastructure 500 comprises multiple virtual sets of resources that time-share an underlying physical resource via an abstraction layer using multi-dimensional scheduling. In this embodiment, the underlying physical resource comprises acceleration resource 506. Multiple virtual sets of resources 512-1, 512-2 and 512-3 each include an NIC 502 and a flash memory 504, but no acceleration element. Instead, the multiple virtual sets of resources 512-1, 512-2 and 512-3 time-share the underlying acceleration resource 506 via an abstraction layer 514 that is provided by the multi-dimensional scheduler. Accordingly, the multi-dimensional scheduler in this embodiment is configured to provide abstraction layer 514 arranged between the spatially-scheduled resources providing the NICs 502 and the flash memories 504 and the time-scheduled acceleration resource 506.

The abstraction layer 514 in this embodiment allows the underlying acceleration resource 506 to be time-shared by multiple virtual sets of resources 512-1, 512-2 and 512-3. The abstraction layer 514 may implement queues for respective ones of the multiple virtual sets of resources 512 in order to present the appearance to each of the associated applications that its portion of the underlying acceleration resource 506 comprises a partitioned and isolated resource.

FIG. 5B illustrates that processing jobs 515 are associated with respective ones of the virtual sets of resources 512 and their time-shared portions of the underlying acceleration resource 506. As mentioned previously, an orchestrator can be used in some embodiments in order to bind together a given one of the virtual sets of resources and its time-shared portion of the additional resource into one or more functions utilized to meet specified requirements of the associated application in performing the corresponding processing job. It is assumed that the functions are configurable to support pause and resume functionality through persistence of state information until terminated.

Figure 6:
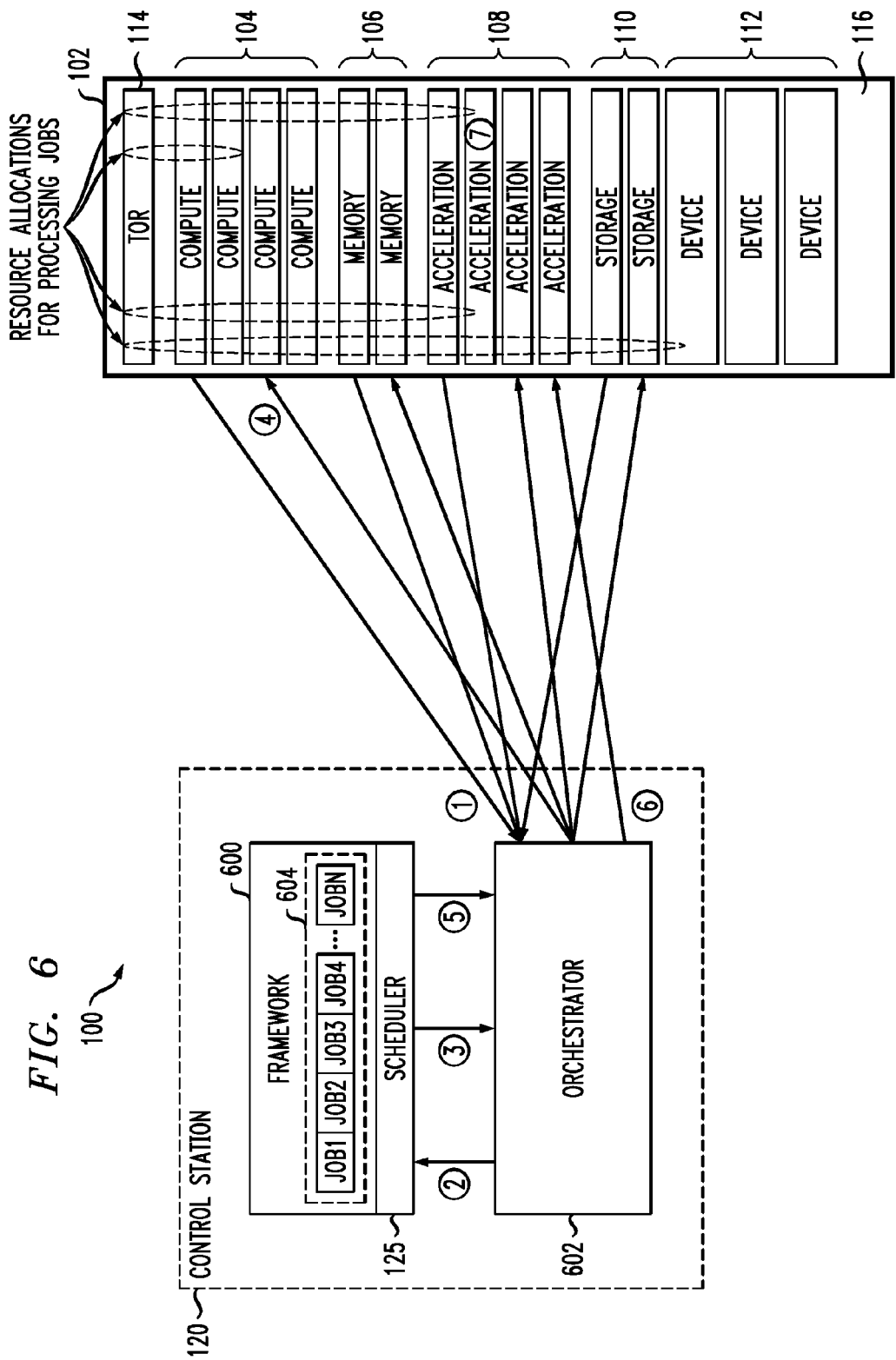
FIG. 6 shows a more detailed view of one possible implementation of multi-dimensional scheduling functionality in the converged infrastructure of FIG. 1.

FIG. 6 shows a more detailed view of one possible implementation of multi-dimensional scheduling functionality in the converged infrastructure of FIG. 1. In this example of an implementation of system 100, rack 102 includes resources 104 through 112, TOR component 114 and additional space 116 as previously described. Also, the control station 120 comprises multi-dimensional scheduler 125 as previously described, but the multi-dimensional scheduler 125 in this embodiment is associated with a job configuration framework 600 and is coupled to an orchestrator 602. There are N processing jobs 604 currently being handled by the framework 600, denoted Job 1, Job 2, . . . Job N. Each such processing job is assumed to be associated with a different application running in the system 100, although in other embodiments one or more applications can each include multiple processing jobs. One or more of the processing jobs 604 can each include one or more quality of service (QoS) requirements to be applied in execution of that job.

The multi-dimensional scheduler 125 in this embodiment logically partitions at least first and second ones of the resources 104 through 112 into multiple virtual sets of resources for performance of the processing jobs 604 associated with the respective applications, such that the multiple virtual sets of resources comprise respective portions of each of the first and second ones of the resources 104 through 112. The multi-dimensional scheduler 125 also controls time sharing of at least an additional one of the resources 104 through 112 between at least a subset of the multiple virtual sets of resources in performing the corresponding processing jobs 604 associated with the respective applications.

The orchestrator 602 in this embodiment binds together a given one of the virtual sets of resources and its time-shared portion of the additional resource into one or more functions utilized to meet specified requirements of the associated application in performing the corresponding processing job. These functions and the respective corresponding allocations of resources are illustrated by heavy dashed lines encircling portions of the resources 104 through 112. The exemplary functions in this embodiment are also assumed to comprise respective portions of the TOR component 114. A given function can comprise any arbitrary set of resources selected from available resources of the system.

The arrangement as illustrated in FIG. 6 includes the following processing operations, which are sequentially numbered in the figure:

1. Resources are advertised to orchestrator;
2. Advertised resources are discovered by scheduler;

3. Resource allocations are requested by scheduler;
4. Corresponding functions are built by orchestrator;
5. Processing jobs are issued by scheduler;
6. Functions are initialized by orchestrator; and
7. Functions are executed using allocated resources.

It is to be appreciated that these particular operations are examples only, and additional or alternative operations can be used in other embodiments. For example, in other embodiments, the framework 600 and orchestrator 602 can be eliminated and the multi-dimensional scheduler 125 can interact directly with the resources of the rack 102 and the applications associated with the processing jobs.

The illustrative embodiments described above provide significant advantages over conventional arrangements. For example, some embodiments provide improved overall resource utilization in an information processing system by avoiding underutilization of monolithic resources in multiple virtual sets of resources. This is achieved in some embodiments by overprovisioning acceleration resources or other monolithic resources through time-sharing of those resources by the multiple virtual sets of resources.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative arrangements of converged infrastructure may be used.

Also, the particular processing operations and other system functionality described in conjunction with the diagrams of FIGS. 1 through 6 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 through 6 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein may illustratively comprise cloud infrastructure. The cloud infrastructure in some embodiments comprises a plurality of containers implemented using container host devices and may additionally or alternatively comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, a CPU, an ASIC, an FPGA, a GPU or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

In some embodiments, processing platforms include at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage products such as VNX® and Symmetrix VMAX®, both commercially available from EMC Corporation of Hopkinton, Mass. Other types of storage products that can be used in implementing a given processing platform in an illustrative embodiment include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices. These and other information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, converged infrastructure, resources and control stations that can benefit from scheduling of different resources across spatial and time dimensions. Also, the particular configurations of system and device elements shown in FIGS. 1 and 3-6 and the processing operations in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform implementing a plurality of resources of converged infrastructure of an information processing system; and
a multi-dimensional scheduler associated with the plurality of resources;
the multi-dimensional scheduler being implemented by at least one processing device of the at least one processing platform, said at least one processing device comprising a processor coupled to a memory;
the multi-dimensional scheduler being configured:
to logically partition at least first and second ones of the plurality of resources of the converged infrastructure into multiple virtual sets of resources for performance of corresponding processing jobs associated with respective applications such that the multiple virtual sets of resources comprise respective portions of each of the first and second ones of the plurality of resources; and
to time-share at least an additional one of the plurality of resources of the converged infrastructure between at least a subset of the multiple virtual sets of resources in performing the corresponding processing jobs associated with the respective applications;
the multi-dimensional scheduler thereby performing scheduling of the first and second resources over a spatial dimension by the logical partitioning of the first and second resources and scheduling of the at least one additional resource over a time dimension by the time-sharing of the at least one additional resource;
wherein the at least one additional resource that is time-shared is not subject to logical partitioning;
wherein the first and second resources that are subject to logical partitioning comprise one of the following:
(i) respective compute and storage resources; and
(ii) respective network interface and memory resources;
wherein the at least one additional resource that is time-shared and not subject to logical partitioning comprises an acceleration resource;
wherein a given one of the virtual sets of resources and a corresponding time-shared portion of said at least one additional resource are part of a container in which the associated application is configured to run in performing the corresponding processing job; and
wherein the container is associated with a particular tenant of a multi-tenant environment of the information processing system and is utilized to implement at least one of a cloud compute node and a cloud storage node for the particular tenant in the multi-tenant environment.

2. The apparatus of claim 1 wherein the resources of the converged infrastructure comprise at least one rack of components each of at least a subset of which is associated with at least one particular monolithic resource.

3. The apparatus of claim 1 wherein the resources comprise respective ones of at least a subset of compute resources, memory resources, acceleration resources, storage resources and device resources.

4. The apparatus of claim 1 wherein the acceleration resource is configured for performance of a singular job of a particular type and implemented using at least one of a field-programmable gate array, an application-specific integrated circuit and a graphics processing unit.

5. The apparatus of claim 1 wherein the container comprises a Docker container or other type of Linux container (LXC).

6. The apparatus of claim 1 wherein the multi-dimensional scheduler is configured to provide an abstraction layer arranged between the at least first and second resources and the at least one additional resource.

7. The apparatus of claim 1 further comprising an orchestrator coupled between the multi-dimensional scheduler and the plurality of resources wherein the orchestrator is implemented by at least one processing device of the at least one processing platform, said at least one processing device comprising a processor coupled to a memory, and wherein the orchestrator is configured to provide information regarding the resources to the multi-dimensional scheduler and to build functions based on the resources for utilization in performing the processing jobs.

8. The apparatus of claim 7 wherein the given virtual set of resources and the corresponding time-shared portion of said at least one additional resource are bound together by the orchestrator into one or more functions utilized to meet specified requirements of the associated application in performing the corresponding processing job.

9. The apparatus of claim 8 wherein the one or more functions are each configured to support pause and resume functionality through persistence of state information until terminated.

10. The apparatus of claim 1 further comprising a control station and wherein the multi-dimensional scheduler is implemented within the control station.

11. A method comprising:
logically partitioning at least first and second ones of a plurality of resources of converged infrastructure into multiple virtual sets of resources for performance of processing jobs associated with respective applications such that the multiple virtual sets of resources comprise respective portions of each of the first and second ones of the plurality of resources; and
time-sharing at least an additional one of the plurality of resources of the converged infrastructure between at least a subset of the multiple virtual sets of resources in performing the corresponding processing jobs associated with the respective applications;
the first and second resources thereby being scheduled over a spatial dimension by the logical partitioning of the first and second resources and the at least one additional resource being scheduled over a time dimension by the time-sharing of the at least one additional resource;

wherein the at least one additional resource that is time-shared is not subject to logical partitioning;

wherein the first and second resources that are subject to logical partitioning comprise one of the following:

(i) respective compute and storage resources; and
(ii) respective network interface and memory resources;

wherein the at least one additional resource that is time-shared and not subject to logical partitioning comprises an acceleration resource;

wherein the logically partitioning and the time-sharing are performed by at least one processing device comprising a processor coupled to a memory;

wherein a given one of the virtual sets of resources and a corresponding time-shared portion of said at least one additional resource are part of a container in which the associated application is configured to run in performing the corresponding processing job; and wherein the container is associated with a particular tenant of a multi-tenant environment of an information processing system comprising the converged infrastructure and is utilized to implement at least one of a cloud compute node and a cloud storage node for the particular tenant in the multi-tenant environment.

12. The method of claim 11 wherein the logically partitioning and the time-sharing are performed by a multi-dimensional scheduler of said at least one processing device with the multi-dimensional scheduler being configured to provide an abstraction layer arranged between the at least first and second resources and the at least one additional resource.

13. The method of claim 11 wherein the given virtual set of resources and the corresponding time-shared portion of said at least one additional resource are bound together by an orchestrator into one or more functions utilized to meet specified requirements of the associated application in performing the corresponding processing job, and wherein the one or more functions are each configured to support pause and resume functionality through persistence of state information until terminated.

14. The method of claim 11 wherein the resources of the converged infrastructure comprise at least one rack of components each of at least a subset of which is associated with at least one particular monolithic resource.

15. The method of claim 11 wherein the acceleration resource is configured for performance of a singular job of a particular type and implemented using at least one of a field-programmable gate array, an application-specific integrated circuit and a graphics processing unit.

16. The method of claim 11 wherein the container comprises a Docker container or other type of Linux container (LXC).

17. A non-transitory processor-readable storage medium having stored therein program code of one or more software programs, wherein the program code when executed by at least one processing device causes the processing device:

to logically partition at least first and second ones of a plurality of resources of converged infrastructure into multiple virtual sets of resources for performance of processing jobs associated with respective applications such that the multiple virtual sets of resources comprise respective portions of each of the first and second ones of the plurality of resources; and to time-share at least an additional one of the plurality of resources of the converged infrastructure between at least a subset of the multiple virtual sets of resources in performing the corresponding processing jobs associated with the respective applications;

the first and second resources thereby being scheduled over a spatial dimension by the logical partitioning of the first and second resources and the at least one additional resource being scheduled over a time dimension by the time-sharing of the at least one additional resource;

wherein the at least one additional resource that is time-shared is not subject to logical partitioning;

wherein the first and second resources that are subject to logical partitioning comprise one of the following:

(i) respective compute and storage resources; and
(ii) respective network interface and memory resources;

wherein the at least one additional resource that is time-shared and not subject to logical partitioning comprises an acceleration resource;

wherein a given one of the virtual sets of resources and a corresponding time-shared portion of said at least one additional resource are part of a container in which the associated application is configured to run in performing the corresponding processing job; and wherein the container is associated with a particular tenant of a multi-tenant environment of an information processing system comprising the converged infrastructure and is utilized to implement at least one of a cloud compute node and a cloud storage node for the particular tenant in the multi-tenant environment.

18. The processor-readable storage medium of claim 17 wherein the logically partitioning and the time-sharing are performed by a multi-dimensional scheduler of said at least one processing device with the multi-dimensional scheduler being configured to provide an abstraction layer arranged between the at least first and second resources and the at least one additional resource.

19. The processor-readable storage medium of claim 17 wherein the given virtual set of resources and the corresponding time-shared portion of said at least one additional resource are bound together by an orchestrator into one or more functions utilized to meet specified requirements of the associated application in performing the corresponding processing job, and wherein the one or more functions are each configured to support pause and resume functionality through persistence of state information until terminated.

20. The processor-readable storage medium of claim 17 wherein the container comprises a Docker container or other type of Linux container (LXC).

* * * * *